United States Patent [19]

Pietraschke

[11] 4,391,046
[45] Jul. 5, 1983

[54] SOLAR HEATED GRAIN DRYING SYSTEM

[76] Inventor: Roy Pietraschke, Rte. #1, Box 194, Cuba, Mo. 65453

[21] Appl. No.: 277,228

[22] Filed: Jun. 25, 1981

Related U.S. Application Data

[63] Continuation of Ser. No. 40,942, May 21, 1979, abandoned.

[51] Int. Cl.³ .............................. F26B 3/06; F26B 3/28
[52] U.S. Cl. ....................................... 34/93; 126/428; 126/448
[58] Field of Search .............. 126/448, 429, 431, 428, 126/351; 34/93, 233

[56] References Cited

U.S. PATENT DOCUMENTS

| | | | |
|---|---|---|---|
| 3,919,784 | 11/1975 | Tonn | 34/93 |
| 3,993,126 | 11/1976 | Taylor | 165/173 |
| 4,008,704 | 2/1977 | Petrie | 126/121 |
| 4,045,880 | 9/1977 | Steffen | 126/431 |
| 4,048,980 | 9/1977 | Googin et al. | 126/448 |
| 4,147,159 | 4/1979 | Thorwaldson | 126/351 |

Primary Examiner—Larry I. Schwartz
Attorney, Agent, or Firm—Cohn, Powell & Hind

[57] ABSTRACT

A solar heated grain drying system including a grain bin with a perforated floor and a solar collector for supplying heated air to the bin. The solar collector includes a plurality of elongate collector pipes, such as irrigation pipes, disposed in spaced side-by-side relation and a manifold connected between the pipes and the bin. Each pipe includes an inlet end receiving air from ambience and an outlet end connected to the intake portion of the manifold. A manifold intermediate portion connects the intake portion of the manifold to an exhaust portion. A duct connects the manifold exhaust portion to the grain bin and a fan is used for transferring air from the manifold exhaust portion through the duct and the perforated floor and through the grain. The manifold intermediate portion includes converging side walls to provide air flow through the manifold in a direction having a component in the same direction as the flow of air through the pipes.

4 Claims, 9 Drawing Figures

U.S. Patent    Jul. 5, 1983    Sheet 1 of 2    4,391,046
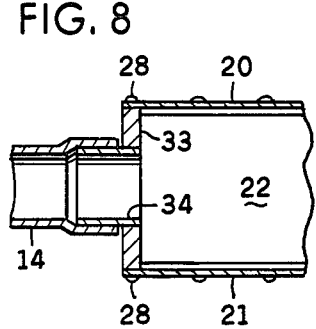
FIG. 8
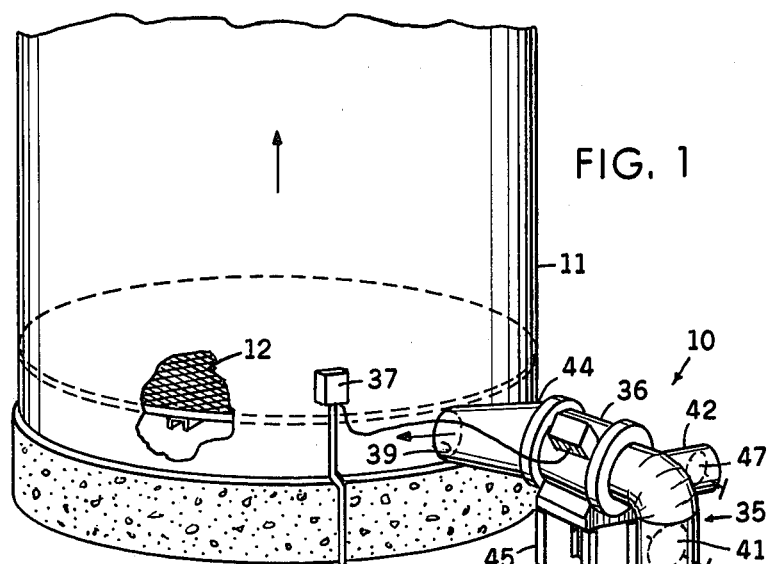
FIG. 1
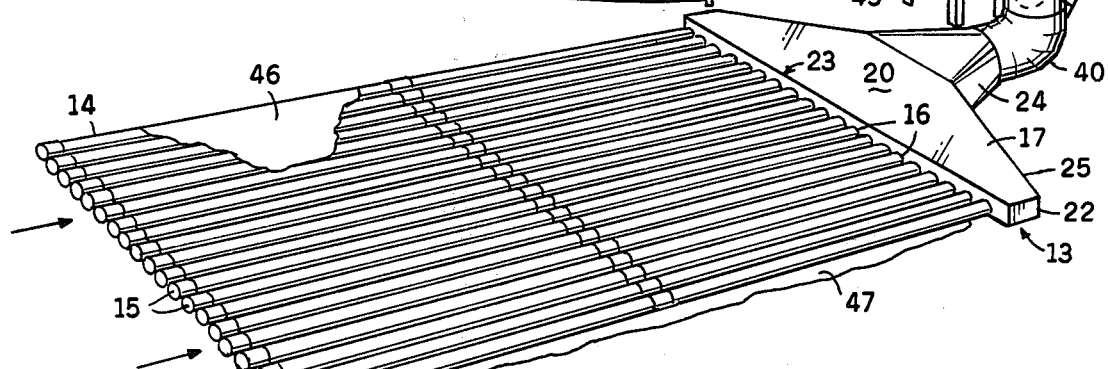
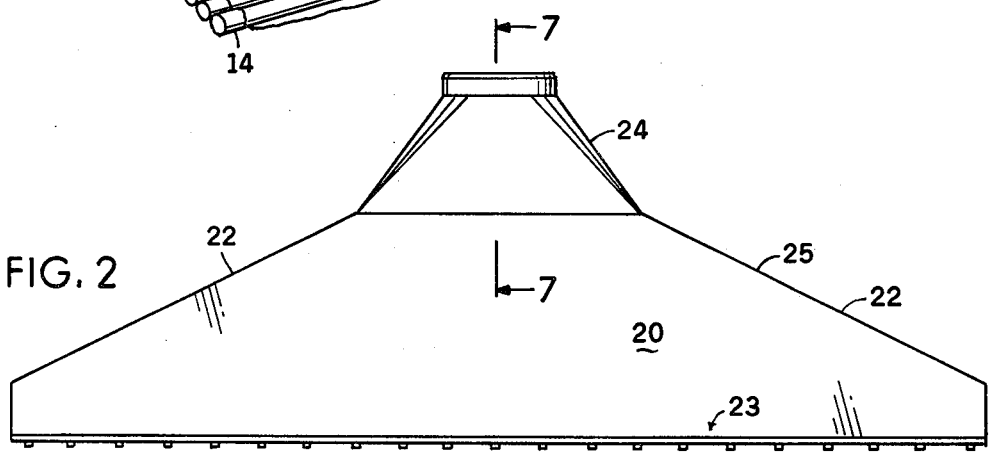
FIG. 2
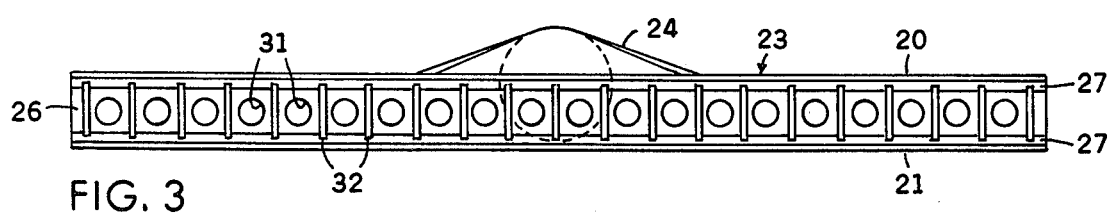
FIG. 3

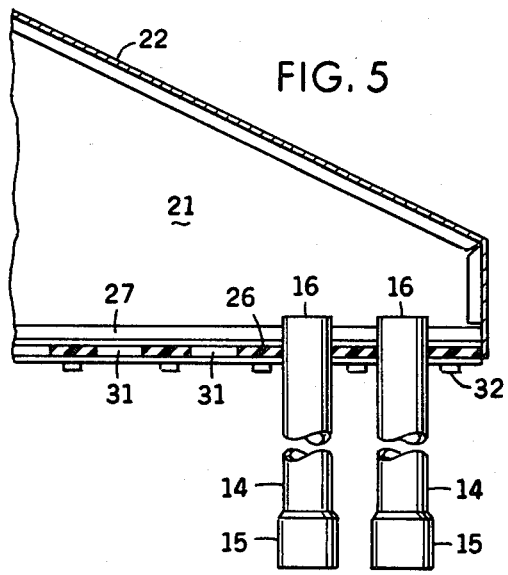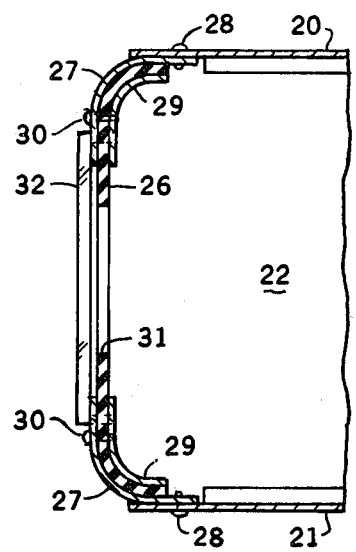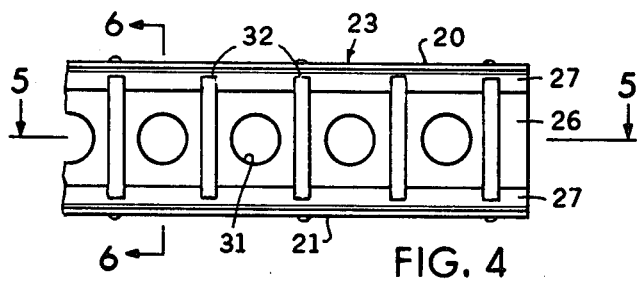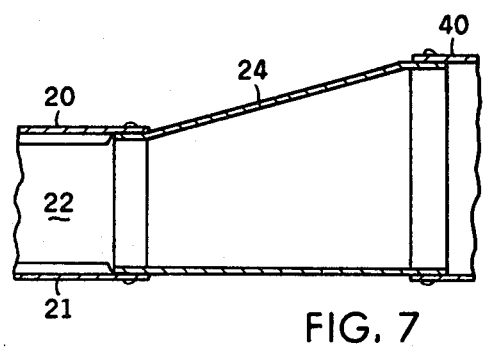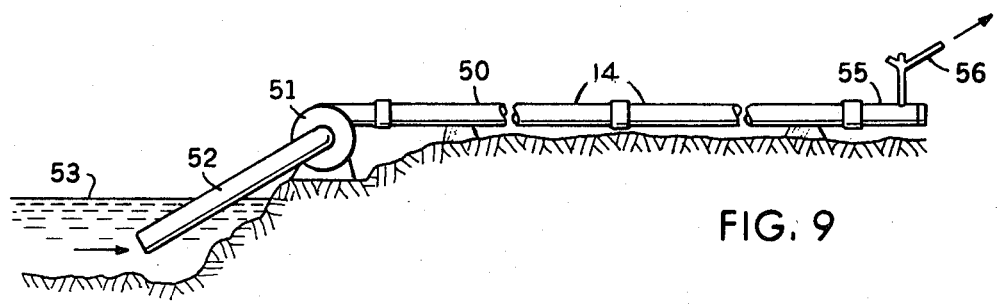

SOLAR HEATED GRAIN DRYING SYSTEM

This is a continuation of application Ser. No. 040,942 filed May 21, 1979 now abandoned.

BACKGROUND OF THE INVENTION

This invention relates generally to a solar heated grain drying system and more particularly to a system which utilizes elongate collector pipes and a manifold to produce a supply of solar heated air.

The use of solar heat for drying grain is disclosed in U.S. Pat. No. 3,919,784. This patent disclosed the use of an elongated solar heating chamber consisting of a frame severed with transparent flexible film. Such a solar collector is not very strong and durable nor is the construction material readily available to the farmer.

The drying of grain by a farmer is not a year long proposition but is only done during a period of time following the harvest. It is therefore not necessary that materials used for a solar heater for grain drying be dedicated to that use all year long. In farming operations it is highly desirable that materials and machinery, not subject to continuous use, be capable of utilization for different purposes so as to decrease the overall capital investment in machinery and materials to the farmer. It is therefore particularly advantageous that the construction materials used in a grain drying solar collector be capable of preforming other functions when not required for use in the solar heater. This advantage is not available in the known prior art.

SUMMARY OF THE INVENTION

This solar heated grain drying system utilizes collector pipes for transfering solar energy to the air to be heated. The farmer can utilize irrigation pipes, which are not in use during the grain drying season, as the collector pipes in the grain drying system and thereby obviate the necessity of purchasing pipes specifically for the solar collector system.

This grain drying system includes a grain bin with a perforated floor; a solar collector means, including a plurality of elongate collector pipes disposed in spaced side-by-side relation, each pipe having an inlet end receiving air from ambience and an outlet end, and a manifold having an intake portion connected to said pipe outlet ends, an exhaust portion and an intermediate portion disposed between said intake and exhaust portions; duct means connecting the manifold exhaust portion to the grain bin and fan means for transferring air from the manifold exhaust portion through the duct means and the perforated floor of the grain bin and through the grain.

According to one aspect of the invention, the manifold intermediate portion includes side wall portions converging toward the exhaust portion to provide air flow through the manifold in a direction having a component in the same direction as the flow of air through the pipes. According to another aspect of the invention, the longitudinal axes of the pipes are substantially parallel and the manifold includes a longitudinal axis extending between the intake portion and exhaust portion in the same general direction as the pipe axes said manifold intermediate portion including side wall portions converging towards the longitudinal axis thereof.

According to yet another aspect of the invention the manifold intake portion includes a front wall having a plurality of stub pipes each connected to one of said collector pipes in communicating relation thereto. According to another aspect of the invention the solar collector pipes are covered with a black exterior surface to increase the absorption of solar energy.

According to yet another aspect of the invention the solar collector pipes are covered with a clear plastic sheet allowing passage of solar energy to the pipes while helping to maintain the heat of the pipes.

In one aspect of the invention the manifold intermediate portion includes a transition portion having side wall converging in the direction of the exhaust portion and upper and lower walls diverging in the direction of the exhaust portion.

In one aspect the exhaust portion includes an exhaust opening communicating with the duct means and having a cross sectional area substantially equal to the combined cross sectional areas of the collector pipes. In another aspect the exhaust portion includes an exhaust opening communicating with the duct means and having a cross sectional area of between two thirds and twice the combined cross sectional areas of the collector pipes.

In another aspect of the invention irrigation line pipes are used in a solar collector heating method for drying grain which provides that the irrigation pipeline is dismantled into a plurality of pipe lengths; and the individual pipe lengths are arranged in side-by-side relation to receive solar heat and are connected to a manifold, air being drawn through the pipes and the manifold and directed into the grain storage bin.

According to one aspect of the method the air drawn through the manifold is directed into a convergent path for at least a portion of its travel through the manifold.

BRIEF DESCRIPTION OF THE DRAWINGS

FIG. 1 is a perspective view of the solar heated grain drying system;

FIG. 2 is a top plan view of the manifold;

FIG. 3 is a front elevational view of the manifold;

FIG. 4 is an enlarged fragmentary front elevational view of the manifold intake portion;

FIG. 5 is a fragmentary cross sectional view of the manifold taken on line 5—5 of FIG. 4;

FIG. 6 is a fragmentary cross sectional view of the manifold taken on line 6—6 of FIG. 4;

FIG. 7 is a fragmentary cross sectional view taken on line 8—8 of FIG. 2 showing the manifold exhaust portion;

FIG. 8 is a fragmentary cross sectional view of a modified manifold intake connection, and FIG. 9 is an elevational view of an irrigation system.

DESCRIPTION OF THE PREFERRED EMBODIMENT

Referring now by reference numerals to the drawings and first to FIGS. 1–3 it will be understood that the solar heated grain drying system generally indicated by 10, includes a grain bin 11 with a perforated floor 12 and a solar collector generally indicated by numeral 13 which is used to supply heat to the grain bin. The perforated floor 12 allows for the passage of heated air from beneath said floor through the grain for drying the grain.

The solar collector includes a plurality of elongate collector pipes 14 disposed in spaced side-by-side relation. Each pipe 14 includes an inlet end 15 receiving air from ambience and an outlet end 16. A manifold 17 is provided at the outlet end of the pipes 14, said manifold including top and bottom walls, 20 and 21 respectively, and side walls 22. The manifold 17 includes an intake portion 23 providing means connecting the outlet ends 16 of the pipes 14 to the manifold 17. The manifold 17 also includes an exhaust portion 24, connected to the grain bin 11 by duct means as will be described, and an intermediate portion 25 which is disposed between the intake and exhaust portions 23 and 24. The manifold will now be more specifically described with reference to FIGS. 4-7.

In one preferred embodiment detailed in FIGS. 4-6, the manifold intake portion 23 includes a front wall of resilient or elastic material such as an elongate rubber strip 26, which may be formed from an inner tube or the like. As best shown in FIG. 6 the upper and lower edges of the rubber strip 26 are clamped between elongate outer and inner straps 27 and 29 respectively and said outer and inner straps and rubber strip are held together by means such as sheet metal screws 30. The outer strips 27 are attached to the manifold top and bottom walls 20 and 21, as by sheet metal screws 28, to attach the rubber strip 26 to the manifold 17.

As best shown in FIG. 4 the rubber strip 26 includes a plurality of spaced openings 31 for receiving the outlet ends 16 of the pipes 14. The openings 31 are smaller in diameter than the outside diameter of the collector pipes 14 to provide a tight seal for the pipes 14 which are inserted through the openings 31. Vertical metal support strips 32 are attached to the outer straps 27, as by spot welding, at locations disposed between the openings 31 to provide support for the rubber strip 26.

A modified construction of the manifold intake portion 23 is indicated in FIG. 8. In this construction the front wall of manifold 17 is formed from a metal plate 33 which is attached, as by screws 40, to the top and bottom manifold walls 20 and 21. The metal plate 33 includes a plurality of pipe stubs 34 attached, as by welding, to said plate and communicating with the interior of the manifold. The pipe stubs 34 receive the outlet ends 16 of the collector pipes 14 to connect said pipes 14 to the manifold 17.

As shown in FIG. 2 the longitudinal axes of the collector pipes 14 are substantially parallel and the manifold 17 includes a longitudinal axis extending between the intake portion 23 and the exhaust portion 24 in the same direction as the pipe axes.

As also shown in FIG. 2, the sidewalls 22 of the manifold intermediate portion 25 converge toward the exhaust portion 24. This convergence provides air flow through the manifold 17 in a direction having a component in the same direction as the flow of air through the pipes 14. As shown in FIG. 6 the exhaust portion 24 includes a transition from a rectangular cross section at the point where the intermediate and exhaust portions 25 and 24 to join to a circular cross section at the point where the duct means 25 connect to the manifold 17.

As shown in FIG. 1, duct means, generally indicated by 35, interconnect the manifold 17 and the grain bin 11 for supplying solar heated air from the solar collector 13 to the bin 11. The duct means 35 includes a fan unit 36 carried by a support 45 and interposed in the duct means 35 to provide means for moving air through the solar collector 13, into the grain bin 11 and forcing the air through the grain. Power is supplied to the fan unit 36 from a fuse and disconnect box 37. Fan intake ductwork 40 interconnects the manifold exhaust portion 24 and the fan unit 36 said fan intake ductwork 40 including a damper 41 for controlling the flow of solar heated air to the said fan unit. An ambient air intake 42 with a damper 43 is connected to the fan intake ductwork 40 to provide air at ambience to the fan unit 36 in order to control the volume and temperature of air being supplied to the bin 11. Drying fan units typically move 810-1700 cubic feet per horsepower depending on grain depth in the bin and the damper assists in controlling air flow to prevent excessive friction when large fans are used with smaller pipe sizes. Fan exhaust ductwork 44 interconnects the fan unit 36 and the bin 40.

It will be understood that the configuration of the duct means 35 is exemplary only and will vary from installation to installation depending upon the particular requirements and configuration of the particular installation. For instance, the fan exhaust ductwork 44 provides the transition in duct size required between the fan 36 outlet and the opening 39 communicating with the grain bin 11. Also, the fan unit 36 could be placed either at the exhaust portion 24 of the manifold 17 or at the grain bin 11 thereby obviating the requirement of fan intake ductwork 40 or fan exhaust ductwork 44.

The collector pipes 14 of the preferred embodiment shown in FIG. 1, are covered with a black exterior surface such as black paint to increase the absorption of solar energy. In addition the collector pipes 14 are covered with a clear plastic sheet 46. The sheet 46 allows passage of solar energy to the pipes 14 while reducing heat losses from connection and radiation and helping to maintain the heat of the pipes 14 which warms air passing therethrough. A second plastic sheet 47 is placed beneath the pipes 14 to both help retain heat and retard the growth of weeds and other vegetation between the collector pipes 14. In lieu of painting the pipes black, a black plastic cover may be used.

In the preferred embodiment collector pipes 14 are lengths of irrigation pipe forming part of an irrigation line such as that shown in FIG. 9 and generally indicated by numeral 50. The irrigation line 50 includes a pump 51 which draws water through an intake pipe 52 from a water supply such as a pond 53. This water is pumped through a plurality of irrigation pipes 14 for use in farming operations. In this system shown, the water is supplied to a spray assembly 55 and dispensed from a spray head 56. When the irrigation line 50 is not in use the line can be dismantled and the pipes used for collector pipes in the manner described above.

It is thought that the operation of the solar heated grain drying system has become apparent from the foregoing description but for completeness of disclosure the operation of the system will be briefly discussed.

Initially, the irrigation line 50 is dismantled to provide a plurality of pipe lengths 14. These pipe lengths, consisting of one or more individual pipes, are arranged in side-by-side relation in a sun-exposed area and are connected to the intake portion 23 of the manifold 17. Because of exposure to the sun, the collector pipes 14 absorb solar energy and are thereby warmed to a considerable temperature. The fan unit 36 draws ambient air into the inlet ends 15 of the pipes 14 which passes through the pipes 14 into the manifold 17 said air being heated by transferrence of heat from the pipes 14 to the relatively cool air. The manifold 17 receiving heated air from the pipes also serves as a solar collector by absorbing solar energy and, to this end, it can also be painted black to increase solar energy absorption.

Air received into the manifold intake portion 23 passes through the manifold 17, the air from the individual pipes 14 converging through the intermediate portion 25 as the air travels toward the exhaust portion 24. This arrangement allows for a more uniform flow of air through the pipes 14 and in the manifold 17 resulting in a more complete absorption of solar energy by the air from the pipes 14 and reduction of heat loss from turbulence in the manifold.

From the manifold 17 the heated air is drawn through the duct means 35 by the fan unit 36 and is forced into the grain bin 11 beneath the perforated floor 12. The warm air then travels through the perforated floor 12 and the grain within the bin 11 to dry the grain 11.

It has been determined that the opening of the exhaust portion 24 communicating with the duct means 35 preferably has a cross section substantially equal to the combined cross sectional areas of the collector pipes 14. However, it is desirable to provide a small range of manifold sizes each of which will accommodate a relatively large range of pipe size. For example, a 12" high manifold having a manifold exhaust opening of 24" diameter i.e. 452 sq. ins. is suitable for forty-two 3" diameter pipes having a combined cross sectional area of about 300 sq. ins. or twenty-five 6" diameter pipes having a cross sectional area of about 700 sq. ins. In otherwords, this exhaust opening can be used with a range of pipe providing a combined cross sectional area of between one-half and twice the area of the opening. As will be readily understood the manifold intake portion can easily be adapted to suit a particular pipe size, as by providing the correct opening in the rubber strip 26, such openings normally being about 1" less in diameter than the diameter of the received pipe. Thus, as will be readily understood the manifold intake portion 23 consisting of straps 27 and 29, resilient strip 26 and support strips 32 can be tailored to suit the set of irrigation pipes 14 at the disposal of the individual farmer and is removable and replaceable as a unit.

I claim as my invention:

1. A method of utilizing straight cylindrical irrigation line pipes for a solar collector system for drying grain, comprising the steps of:
    (a) dismantling the irrigation pipe line after the irrigation season to provide a plurality of pipe lengths,
    (b) arranging the pipe lengths separately in side-by-side relation to receive solar heat,
    (c) removably connecting one end of the pipe lengths to a manifold leaving the other end open,
    (d) drawing air through the pipes and the manifold,
    (e) directing warmed air from the manifold into a grain storage bin, and
    (f) dismantling the solar collector system to utilize the pipes for irrigation during the irrigation season.

2. A system as defined in claim 1, including the additional step of:
    (g) directing the air drawn through the manifold into a converging path having a component in the direction of the longitudinal axes of the collector pipes for the major portion of its travel through the manifold.

3. A system as defined in claim 1, including the additional step of:
    (g) arranging the irrigation pipes in end to end relation in removably connected lengths of more than one pipe.

4. A system as defined in claim 1, including the additional step of:
    (g) sealing the irrigation pipes to the manifold by an elastic seal.

* * * * *